(12) United States Patent
Christenson et al.

(10) Patent No.: US 7,720,802 B2
(45) Date of Patent: May 18, 2010

(54) RECLAIMING RESIDENT BUFFERS WHEN A RECLAIM THRESHOLD HAS BEEN EXCEEDED BY SWAPPING THE OLDEST IN USE BUFFER AND A NEW BUFFER, AND REFERENCING THE NEW BUFFER VIA AN UPDATED SET OF READ AND WRITE POINTERS

(75) Inventors: David A. Christenson, Fergus Falls, MN (US); Richard F. Jirsa, Rochester, MN (US); John C. Kasperski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 643 days.

(21) Appl. No.: 11/619,441

(22) Filed: Jan. 3, 2007

(65) Prior Publication Data
US 2008/0162859 A1 Jul. 3, 2008

(51) Int. Cl.
*G06F 12/00* (2006.01)

(52) U.S. Cl. ...................... 707/205; 711/170

(58) Field of Classification Search ................ 711/170; 707/205
See application file for complete search history.

(56) References Cited

U.S. PATENT DOCUMENTS

| | | | | |
|---|---|---|---|---|
| 6,128,715 | A * | 10/2000 | Wang et al. | 711/168 |
| 6,233,244 | B1 * | 5/2001 | Runaldue et al. | 370/412 |
| 7,433,904 | B1 * | 10/2008 | Burns et al. | 707/206 |
| 2006/0074872 | A1 * | 4/2006 | Gordon | 707/3 |

* cited by examiner

Primary Examiner—Hong Kim
(74) Attorney, Agent, or Firm—Cantor Colburn, LLP; James R. Nock

(57) ABSTRACT

Systems methods and computer products for reclaiming resident buffers on demand. Exemplary embodiments include systems and methods for reclaiming resident buffers, including allocating a buffer, determining that the buffer allocation pushes the buffer pool below a reclaim threshold, marking an oldest in-use buffer to be reclaimed, determining that all messages referencing the buffer have been queued, allocating a new buffer and performing a swap of the oldest in-use buffer and the new buffer, performing a free message block operation and updating a message block by updating a set of read and write pointers to point to the new buffer.

16 Claims, 15 Drawing Sheets

RECLAIMING RESIDENT BUFFERS WHEN A RECLAIM THRESHOLD HAS BEEN EXCEEDED BY SWAPPING THE OLDEST IN USE BUFFER AND A NEW BUFFER, AND REFERENCING THE NEW BUFFER VIA AN UPDATED SET OF READ AND WRITE POINTERS

TRADEMARKS

IBM® is a registered trademark of International Business Machines Corporation, Armonk, N.Y, U.S.A. Other names used herein may be registered trademarks, trademarks or product names of International Business Machines Corporation or other companies.

BACKGROUND OF THE INVENTION

1. Field of the Invention

This invention relates to resident computer memory, and particularly to system methods and computer products for reclaiming resident buffers on demand.

2. Description of Background

Resident computer memory is often used to pass data between a Network Interface Card (NIC) and a computer. Typically, an inbound or outbound packet is immediately copied from resident memory to more plentiful nonresident buffers, so the limited resident memory can be reused for subsequent packets. Copying data is extremely expensive, and can cost as much as 50% of the total network CPU consumption. An alternative is to pin and unpin memory, converting it from resident to nonresident memory, but this is also very expensive and may require an additional step to remap memory so it is accessible by the NIC DMA engine. A third alternative is to eliminate the buffer copy by allowing the TCP/IP stack to process the data directly in the resident buffers without copying or unpinning the memory. This approach sounds good; however, the TCP/IP stack protocol consumes considerable buffer resources and often queues buffers for indeterminate periods of time to accommodate inbound and outbound flow control (e.g., TCP window). A mechanism is required to reclaim in-use resident buffer resources from the TCP/IP stack.

A multi-layered network protocol such as TCP/IP inserts and removes protocol headers as packets are passed up and down the network protocol layers. Each protocol layer has a different view of the data; for example, the socket layer processes a raw buffer (multiple packets) containing no protocol headers, TCP inserts/removes TCP headers, IP inserts/removes IP headers and the LAN network driver inserts/removes link headers. A simplistic approach is to just copy and reformat the data at each protocol layer; however, this is obviously very expensive, so buffer management mechanisms have been defined that use reference counts and message structures to allow a single buffer to be shared, adjusting pointers to remove and add headers. For example Linux uses sk_buffs and other systems such as System i5, AIX, HP and Sun use STREAMS. Since, STREAMS is the most widely used buffer management protocol it is chosen as the preferred embodiment for this invention.

In a buffer expiration method, all resident buffers are marked with a "critical" bit and each protocol layer is responsible to start a timer every time a critical buffer is queued. When a timer expires, the critical buffer is reclaimed (i.e., data copied and critical buffer is freed). Since, the TCP protocol uses a retransmit timer for its queued send buffers, it is reasonable to also use this same timer as a buffer expiration timer. However, the TCP/IP protocol doesn't maintain any timers for its queued receive buffers. Receive buffers may be queued in multiple places: IP reassembly queue, out-of-order segment queue and socket receive queue. Unfortunately, no timer is implemented for receive buffers; therefore, addition timers are required to support the buffer expiration method. The main problems with the buffer expiration method include: timers being expensive; reclaim is triggered by a timer and not by a real buffer shortage, causing: buffers to be reclaimed too soon (i.e., timer expires, but there is no buffer shortage) and buffers to be reclaimed too late (i.e., buffer shortage occurs and timers don't expire).

In a search and reclaim method, all resident buffer are marked with a "critical" bit and a buffer shortage is detected by the buffer pool manager and the TCP/IP stack is notified. In general, the TCP/IP stack performs a linear search through all of it connection endpoints and reclaims critical buffers. The search and reclaim method is triggered by a buffer shortage instead of a timer to ensure that buffers are only reclaimed when needed. This is an on demand approach: however, the processing required to find and reclaim buffers is extremely CPU intensive. Therefore, the search and reclaim must be initiated infrequently and large numbers of buffers must be reclaimed during each cycle to reduce the number of search and reclaim cycles. This method causes large CPU spikes and reclaims more buffers than are really necessary. An ideal method must spread the reclaim processing more evenly to prevent CPU spikes.

In a hot swap method, a severe buffer shortage is detected by the buffer pool manager and the current resident buffers are unpinned and unmapped. In general, new buffers are allocated, pinned and mapped to replenish the buffer pool. The hot swap method is a novel approach; however, like the search and reclaim method, it causes large CPU spikes and is extremely CPU intensive. The hot swap should only be used when the other reclaim methods are not effective and the buffer shortage becomes so severe that immediate action is required to replenish the buffer pool.

SUMMARY OF THE INVENTION

Exemplary embodiments include a method for reclaiming resident buffers, including allocating a buffer, determining that the buffer allocation pushes the buffer pool below a reclaim threshold, marking an oldest in-use buffer to be reclaimed, determining that all messages referencing the buffer are queued or freed, alllocating a new buffer and performing a swap of the oldest in-use buffer and the new buffer, performing an free message block operation and updating a message block by updating a set of read and write pointers to point to the buffer.

Additional exemplary embodiments include a computer readable medium having computer executable instructions for performing a method including allocating a buffer, determining that the buffer allocation pushes the buffer pool below a reclaim threshold, marking an oldest in-use buffer to be reclaimed, determining that all messages referencing the buffer are queue or freed, allocating a new buffer, performing a swap of the oldest in-use buffer and the new buffer, when all messages referencing the buffer have been either queued or freed, freeing a message block and updating a message block by updating a set of read and write pointers to point to the new buffer.

Further exemplary embodiments include a computer-readable medium having a plurality of data fields stored on the medium and representing a data structure, including a first data field containing data representing a system call for allocating a buffer from a specified buffer pool, a second data field containing data representing a system call for queuing a message so that the buffer pool can reclaim the buffer, a third data field containing data representing a system call for unqueuing a message so that a message block can be updated, a fourth data field containing data representing a system call for freeing a buffer pool and a fifth data field containing data representing a system call for duplicating a message block to create reference to the buffer, wherein a buffer reclaiming process is performed when all messages referencing the buffer have been either queued or freed.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically, the systems and methods described herein handle shared buffer fragments queued at multiple protocol layers, which can easily be adopted by most operating system kernels. Furthermore, minimal impacts to industry standard message structures (e.g., STREAMS, sk_buffs) are realized. In addition, the systems and methods lay the foundation for zero copy APIs (e.g., RDMA, kDAPL, etc.). In exemplary implementations, the reclaiming of buffers occurs while in-use. On demand is based on buffer shortage, that is, the processes described herein only reclaims buffers that are needed. Furthermore, buffer reclaim processes are evenly spread, thereby eliminating CPU spikes. In addition, no timers are implemented and there is no need to iterate through buffer lists looking for critical buffers.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Exemplary embodiments include a system and method in which STREAMS can be extended to enable the network device driver to dynamically reclaim in-use resident buffers from the TCP/IP stack. Linux sk_buffs can also be extended in a similar fashion. In exemplary implementations, a buffer pool automatically reclaims in-use buffers when the number of available buffers drop below a user defined threshold. The goal is to always have an vailable buffer on demand. In general, a buffer that is still in-use can be reclaimed, that is packets that are queued by TCP/IP can be copied to a new buffer and then the buffers are swapped. In general, a buffer is not swapped while protocol code is actively referencing the buffer. A queued_cnt keeps track of the number of queued messages and delays the buffer swap until all messages are queued or freed.

Several existing STREAMS routines are implemented and extended while new STREAMS routines are also defined. As understood by those skilled in the art, STREAMS represent a collection of system calls, kernel resources, and kernel utility routines that can create, use, and dismantle a stream. A stream is a full-duplex processing and data transfer path between a driver in kernel space and a process in user space. The STREAMS mechanism constructs a stream by serially connecting kernel-resident STREAMS components, each constructed from a specific set of structures. The following existing STREAMs routines are extended:

| | |
|---|---|
| freeb | free message block |
| freemsg | free complete message (all message blocks) |
| dupb | duplicate a message block to create another reference to the buffer without copying the data |
| dupmsg | duplicate all messages blocks |

The following new STREAMS routines are defined:

| | |
|---|---|
| makepool | make a new buffer pool |
| freepool | free buffer pool |
| pallocb | allocate a buffer from the specified buffer pool |
| pbufcall | call the specified user function when a buffer is available in the pool |
| punbufcall | cancel previous pbufcall |
| msgqueued | called before a message is queued to aid the buffer pool in reclaiming the buffer |
| msgunqueued | called after a message is unqueued to prevent the buffer pool from reclaiming the buffer |

Figure 1:
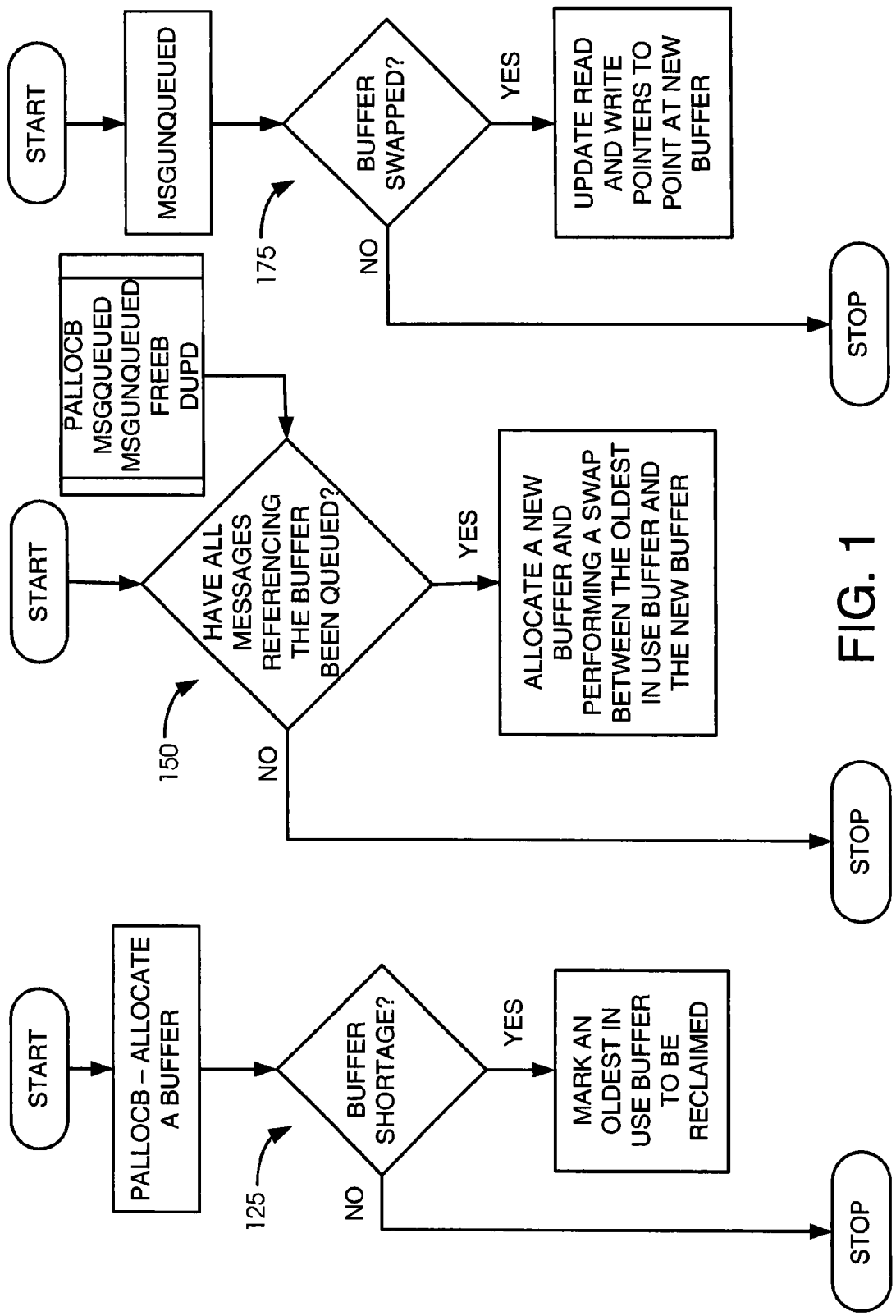
FIG. 1 illustrates the three stages that are performed to reclaim a buffer.

FIG. 1 illustrates the three stages 125, 150, 175 that are performed to reclaim a buffer. A stage 125, a buffer reclaim is initiated. If a new buffer allocation pushes the buffer pool below the reclaim threshold, then the oldest in-use buffers are marked to be reclaimed. At stage 150, the buffers are swapped. A buffer marked for reclaim is not swapped until all messages are queued and/or freed. The actual buffer swap may occur while executing pallocb, msgqueued, msgunqueued, feeb or dupb. At stage 175 the message block is updated. The buffer read and write pointers in each individual message block is not updated until the message is unqueued.

The function prototypes for the new STREAMS functions are defined as now discussed.

A int makepool(int max_buffers, int reclaim_threshold, int buffer_size) function creates a buffer pool, and is defined as follows:

| | |
|---|---|
| max_buffers | The maximum number of buffers to allocate. If the maximum buffers are exceeded, a user callback. (e.g., STREAMS pbufcall) can be enable to notify the user when a buffer is returned to the pool. |
| reclaim_threshold | When the number of available buffers drops below this threshold, an attempt is made to reclaim in-use buffers. |
| buffer_size | All buffers in the pool are the same size. STREAMS messages and sk_buffs allow a single buffer to be split into multiple packets; however, the buffer is not returned to the pool until all the individual packets are freed. |
| returns | The pool_id used to identify the buffer pool for the message allocation. |

A int freepool(int pool_id) function frees a buffer pool, and is defined as follows:

| | |
|---|---|
| pool_id | The pool_id of the buffer pool to free. The buffer pool is not freed until all allocated messages are returned. |
| returns | Return code. | a msgb* palloeb(int pool_id, int flags) function allocates a message from the specified buffer pool, and is defined as follows:

| | |
|---|---|
| pool_id | Identifies the buffer pool for the allocation. |
| flags | NOT_RECLAIMABLE - Allocate a buffer that cannot be reclaimed.<br>RECLAIMABLE - Allocate a buffer that is reclaimable (i.e., buffer can be swapped). |
| returns | The allocated STREAMS message. If the buffer pool is empty, NULL is returned; the pbufcall function can be used to cause a user function to be called when a message is returned to the pool. |

A in pbufcall(int pool_id, void (*func)(void*), void *arg) function schedules calls to user routines when a buffer is available in buffer pool, and is defined as follows:

| | |
|---|---|
| pool_id | Identifies the buffer pool for the allocation. |
| func | Function to call when a buffer is available in buffer pool. |
| arg | Argument to pass to user function when a buffer becomes available in the pool. |
| returns | An id that can be used to cancel the bufcall. |

A void punbufcall(int id) function cancels an outstanding bufcall, and is defined as follows:

| | |
|---|---|
| id | The id returned by pbufcall. |

A void msgqueued(msgb *msg) function can be called before a message is queued, and is defined as follows:

| | |
|---|---|
| msg | Pointer to message. All message blocks are affected. |

A void msgunqueued(msgb *msg) function is called after a message is unqueued and is defined by the following:

| | |
|---|---|
| msg | Pointer to message. All message blocks are affected. |

Figure 2A:
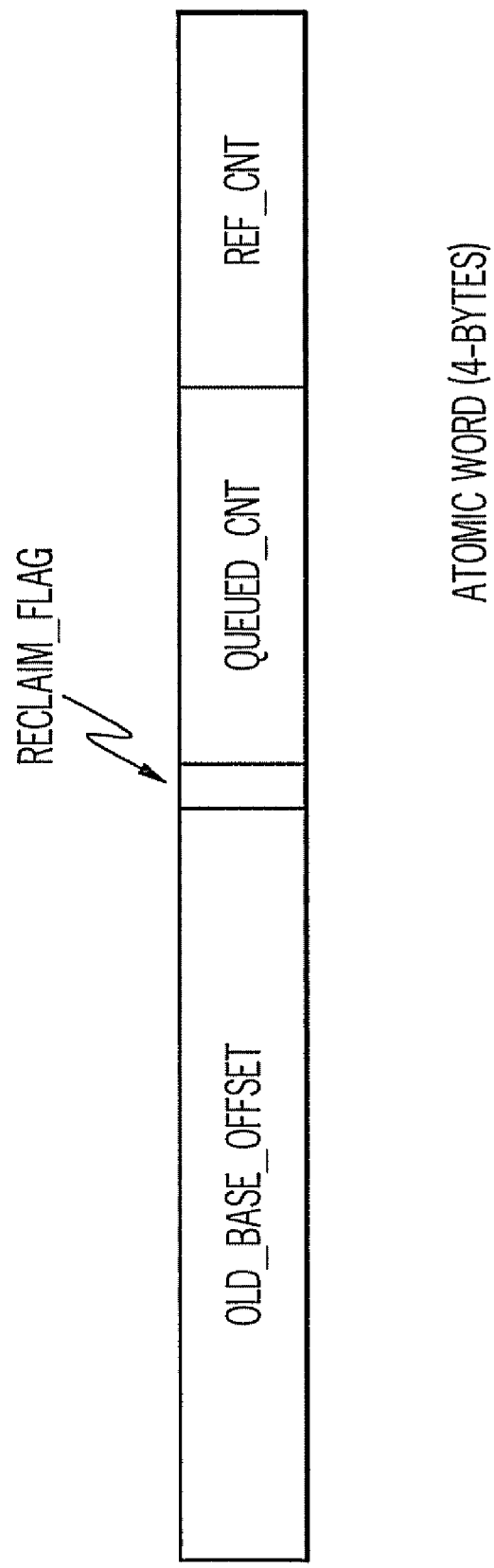
FIG. 2A shows the new reclaim_flag bit, queued_cnt and old_offset field.

FIG. 2A shows the new reclaim_flag bit, queued_cnt and old_base_offset field. The reclaim_flag bit and queues_cnt is appended to the existing ref_cnt field in the same atomic 4-byte word. Packing these fields into a single quad-word aligned word, significantly improves performance, since all three fields can be atomically loaded and stored, eliminating the requirement to synchronize with a conventional lock. For example, the lwarx (load word and reserve indexed) and stwex (store word conditional indexed) PowerPC assembly language instructions can be used to atomically change and take snapshots of all three fields.

The old_base_offset is implemented during the buffer swap to enable the read and write pointer to be updated to point at the correct offset in the new buffer.

Figure 2B:
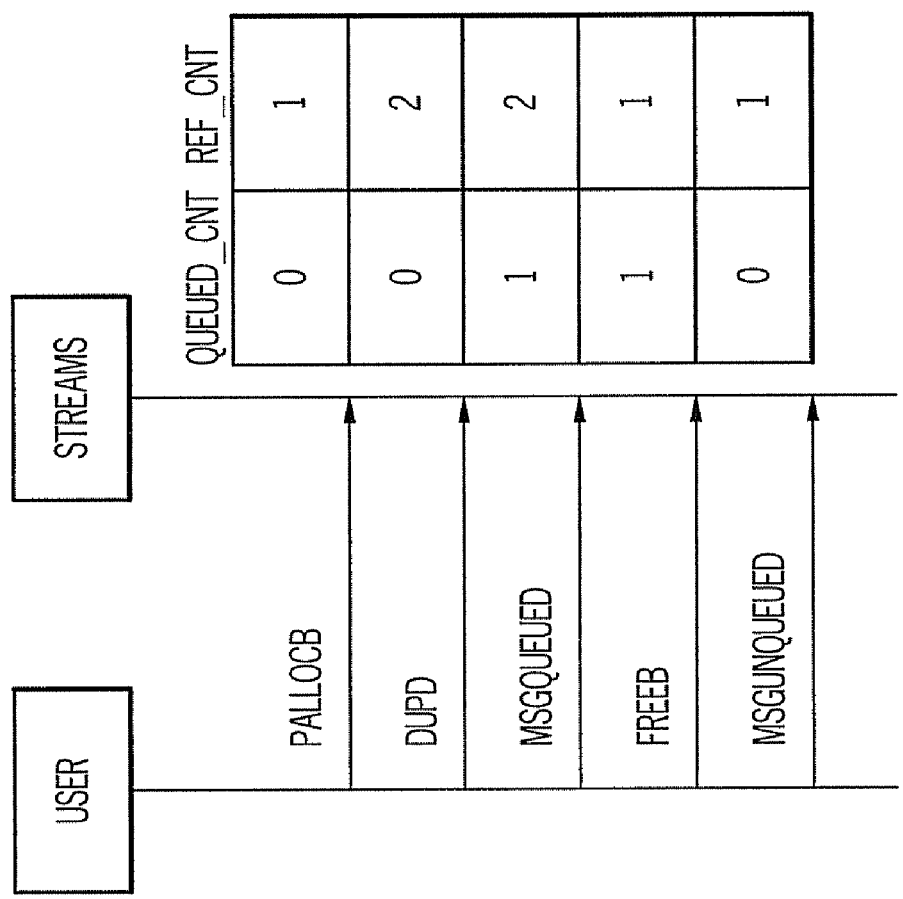
FIG. 2B shows how the queued_cnt and ref_cnt is incremented and decremented by the STREAMS functions.

FIG. 2B shows how the queued_cnt and ref_cnt is incremented and decremented by the Streams functions. In general, when queued_cnt =ref_cnt, the buffer is eligible to be reclaimed and swapped.

Figure 3:
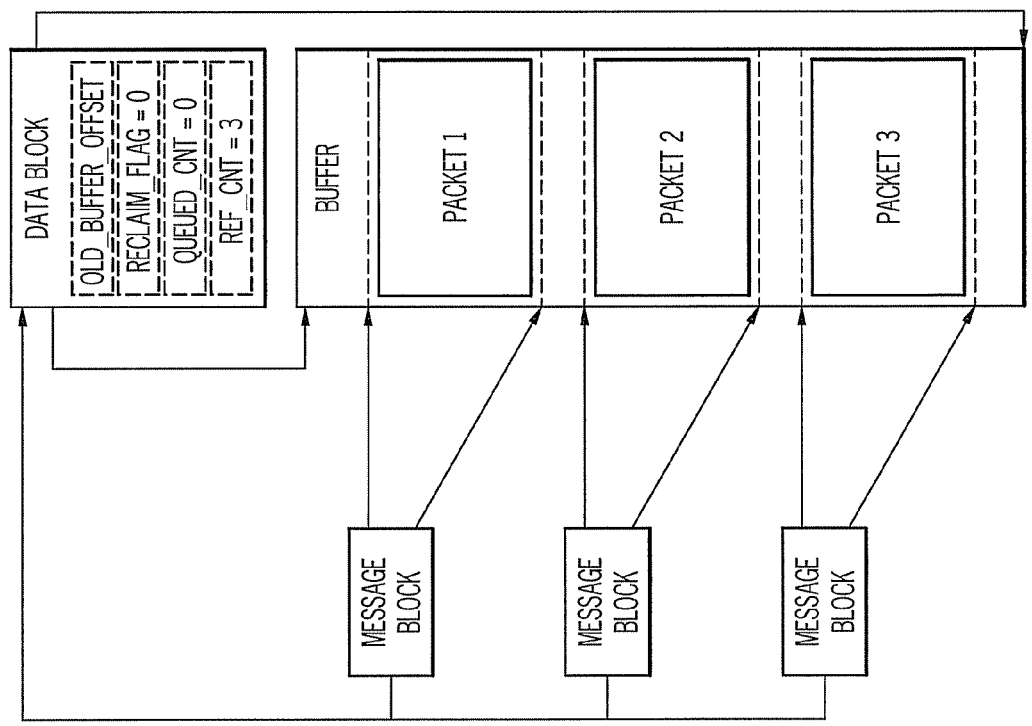
FIG. 3 illustrates the STREAMS message structure with the new queued_cnt field added to the data block.

FIG. 3 illustrates the STREAMS message structure with the new queued_cnt field added to the data block. The ref_cnt field tracks the number of messages that reference the buffer. FIG. 3 shows three messages, each pointing at a different packet contained in the same buffer. Empty space is often left before and after each packet to allow headers and trailers to be easily added by the various protocol layers. Each time an individual message is freed, the ref_cnt is decremented; however, the buffer is not freed until the ref_cnt goes to zero (i.e., the last message is freed). Note, packets contained in the same buffer may be concurrently processed and queued by multiple protocol layers. The new queued_cnt field tracks the number of messages that are currently queued. The queued_cnt is incremented when a message is queued to a queue and decremented when the message is dequeued. This is accomplished using the msgqueued( ) and msgunqueued( ) STREAMS routines.

A queued message is not actively being processed by any network protocol. For example, a message could be queued waiting for a window update or an acknowledgement. If the ref_cnt equals the queued_cnt, all messages are queued and it is safe to reclaim the buffer and return it to the buffer pool for reuse, that is, copy and swap the current buffer with another buffer.

The new reclaim_flag bit is set in the data block when the buffer pool runs low (i.e., available buffers are less then the reclaim threshold) to trigger the reclaim of the buffer. The actual buffer swap doesn't occur until the queued_cnt equals the ref_count.

In general, a queued message can be duplicated; however, the resulting duplicated message is not considered "queued". A queued message's read and write pointer can be used to determine the size of the data (i.e., perform arithmetic on pointers). In general, a queued message's buffer content can't be reference or changed. In addition, a queued message cannot be copied, since this requires a buffer reference. A queued message's base and limit pointers can't be referenced.

The following discussion is related to duplicating a "queued" message. Network protocol code often manipulates a queued messages. For example, the TCP protocol manages a send queue and duplicates a message to form a packet to transmit to the device driver. The messages contained in the send queue are "queued". However, the duplicate message transmitted to the device driver is not queued.

Figure 4:
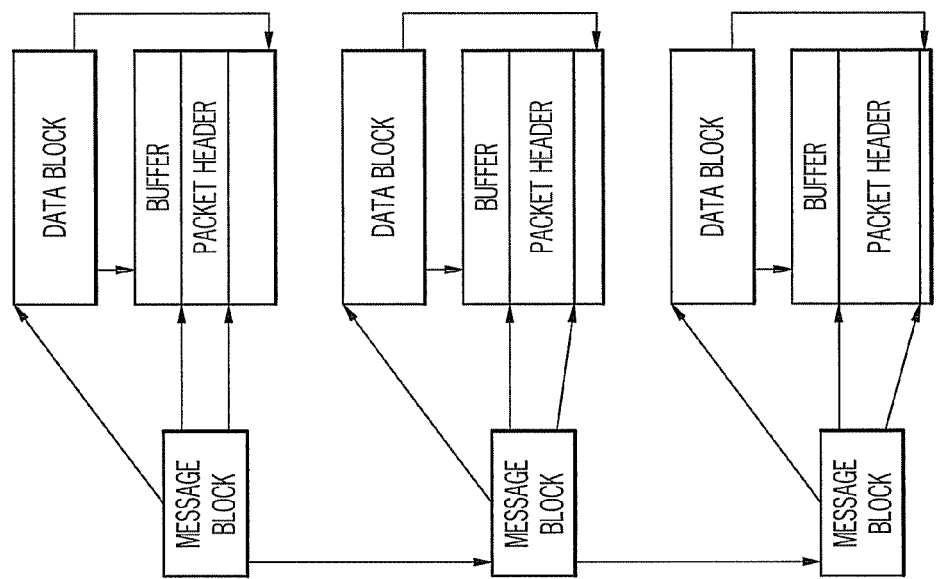
FIG. 4 illustrates how a single packet can be split across multiple buffers, showing some of the flexibility provided by STREAMS messages.

FIG. 4 illustrates how a single packet can be split across multiple buffers, showing some of the flexibility provided by STREAMS messages. Referring again to FIG. 3, all packets are contiguous in the same buffer.

Figure 5:
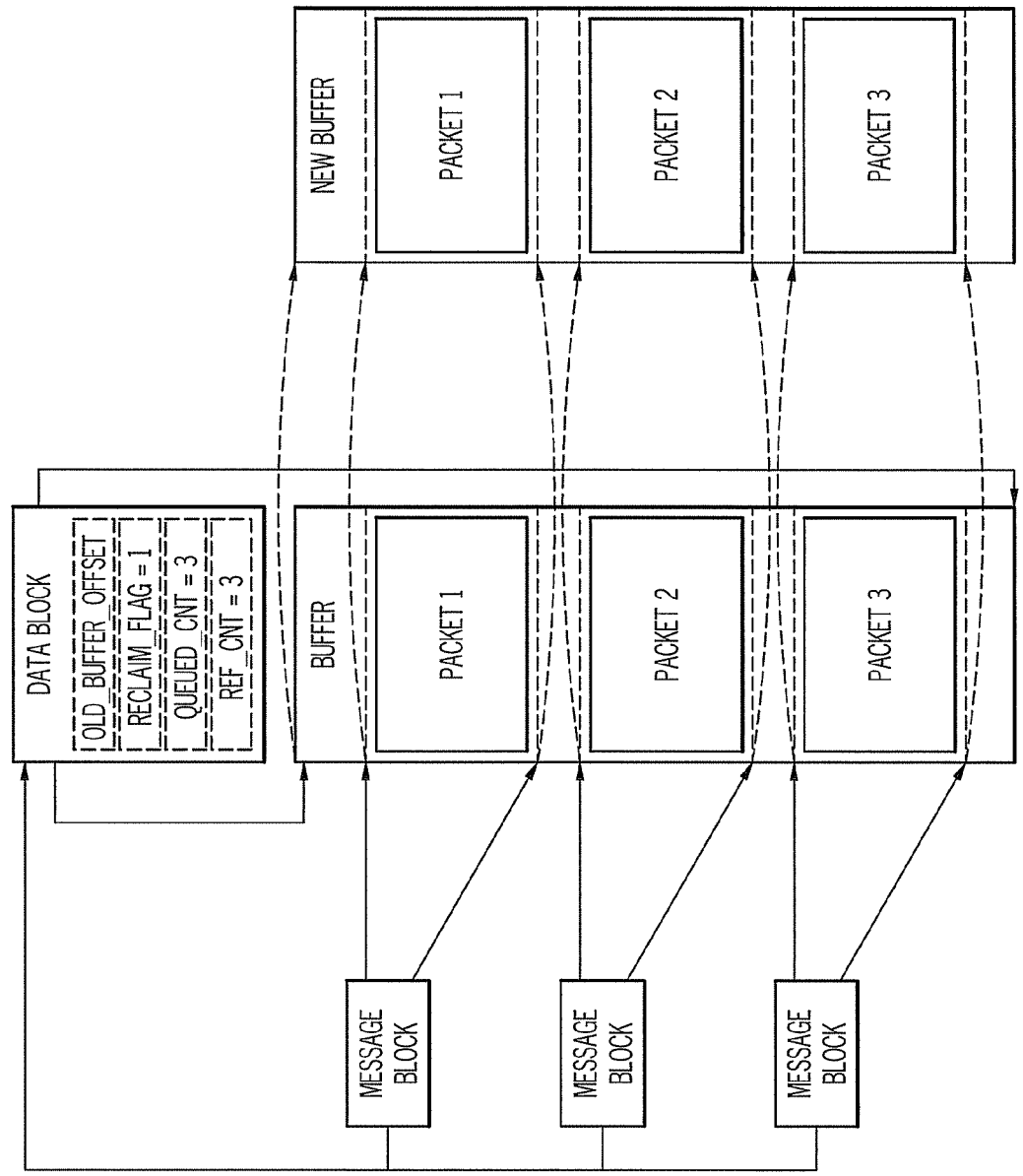
FIG. 5 illustrates how a buffer with all its messages queued (queued_cnt=ref_cnt) is reclaimed by copying the packets to a new buffer and updating all pointer to point at the new buffer.

FIG. 5 illustrates how a buffer with all its messages queued (queued_cnt=ref_cnt) is reclaimed by copying the packets to a new buffer and updating all pointer to point at the new buffer.

Figure 6:
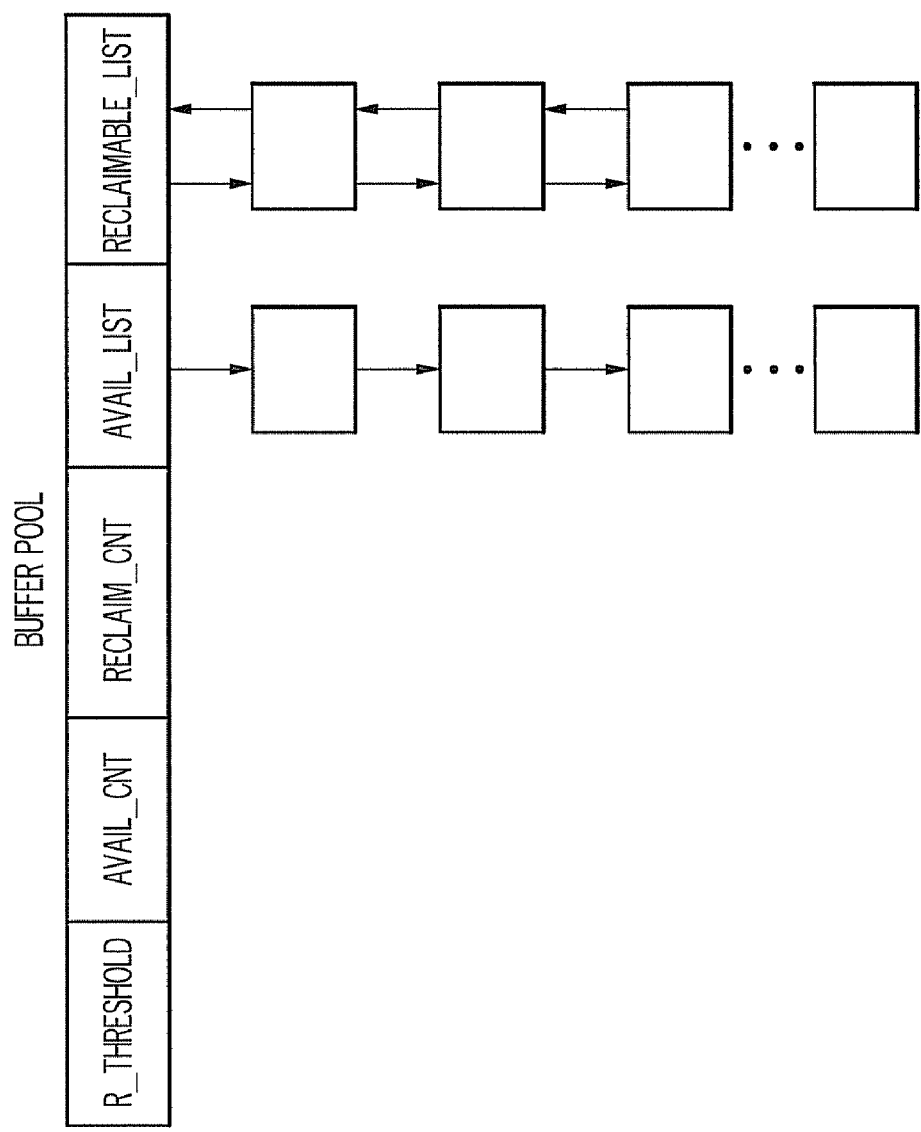
FIG. 6 illustrates the buffer pool structure.

FIG. 6 illustrates the buffer pool structure. The r_threshold specifies when to automatically reclaim the oldest in-use, buffer(s). The avail_cnt specifies the number of buffers currently in the avail_list. The reclaim_cnt is the number of buffers currently being reclaimed. The avail_list is a LIFO list of available buffers. The reclaimable_list is a list of in-use buffers ordered by age (oldest first) that are candidates to be reclaimed. As buffers are allocated, they are inserted into the list and removed from the list when the buffer is freed or reclaimed. In general, the list allows any arbitrary buffer to be removed. Due to the frequency updates to this list, an extremely low contention (e.g., lock free) and scalable queue data structure is generally implemented. Some fields, such as max_buffers and current_buffers, are not included in FIG. 6, for illustrative purposes.

Figure 7:
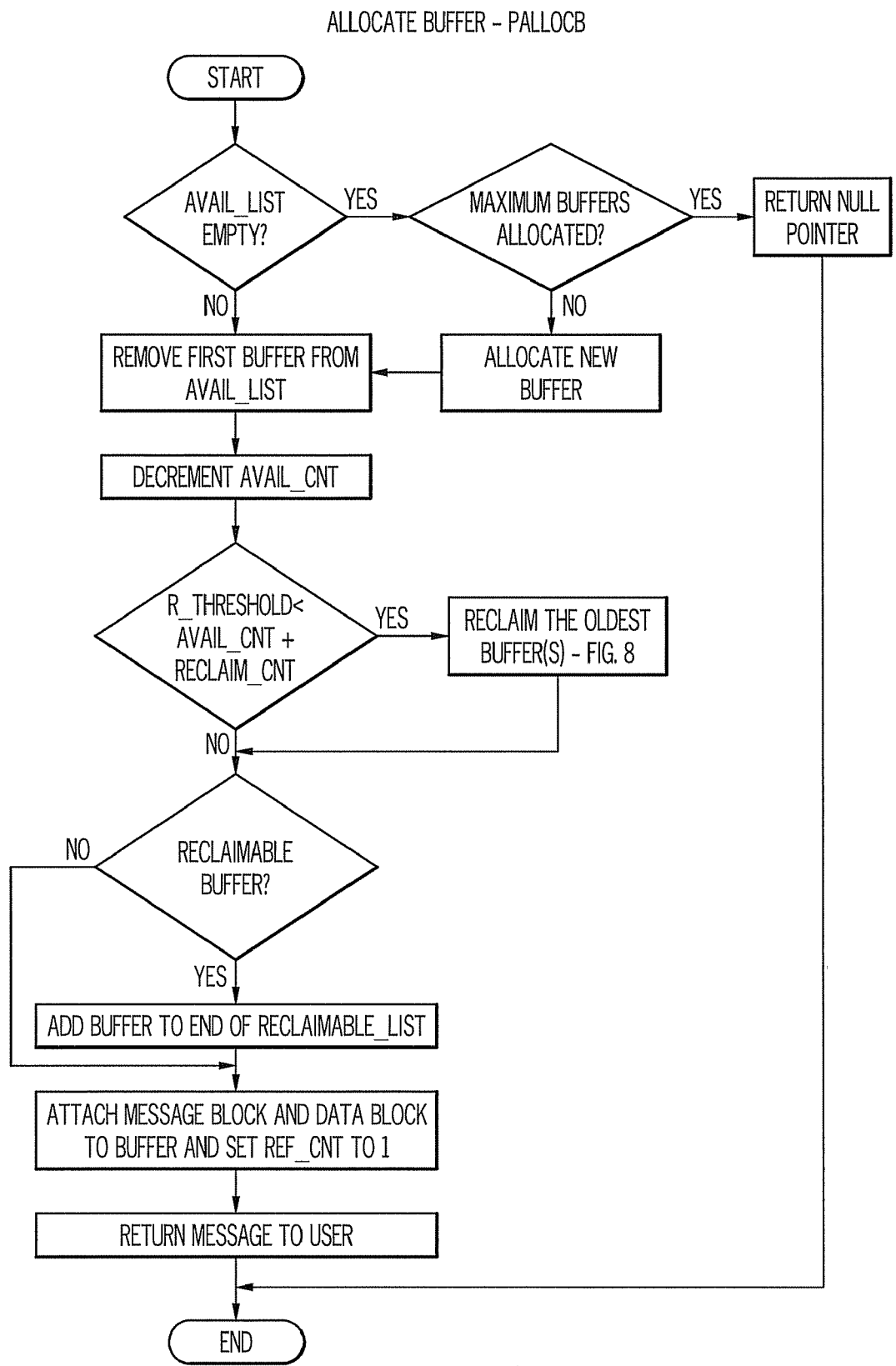
FIG. 7 is a flow chart of the new pallocb function.

FIG. 7 is a flow chart of the new pallocb function.

Figure 8:
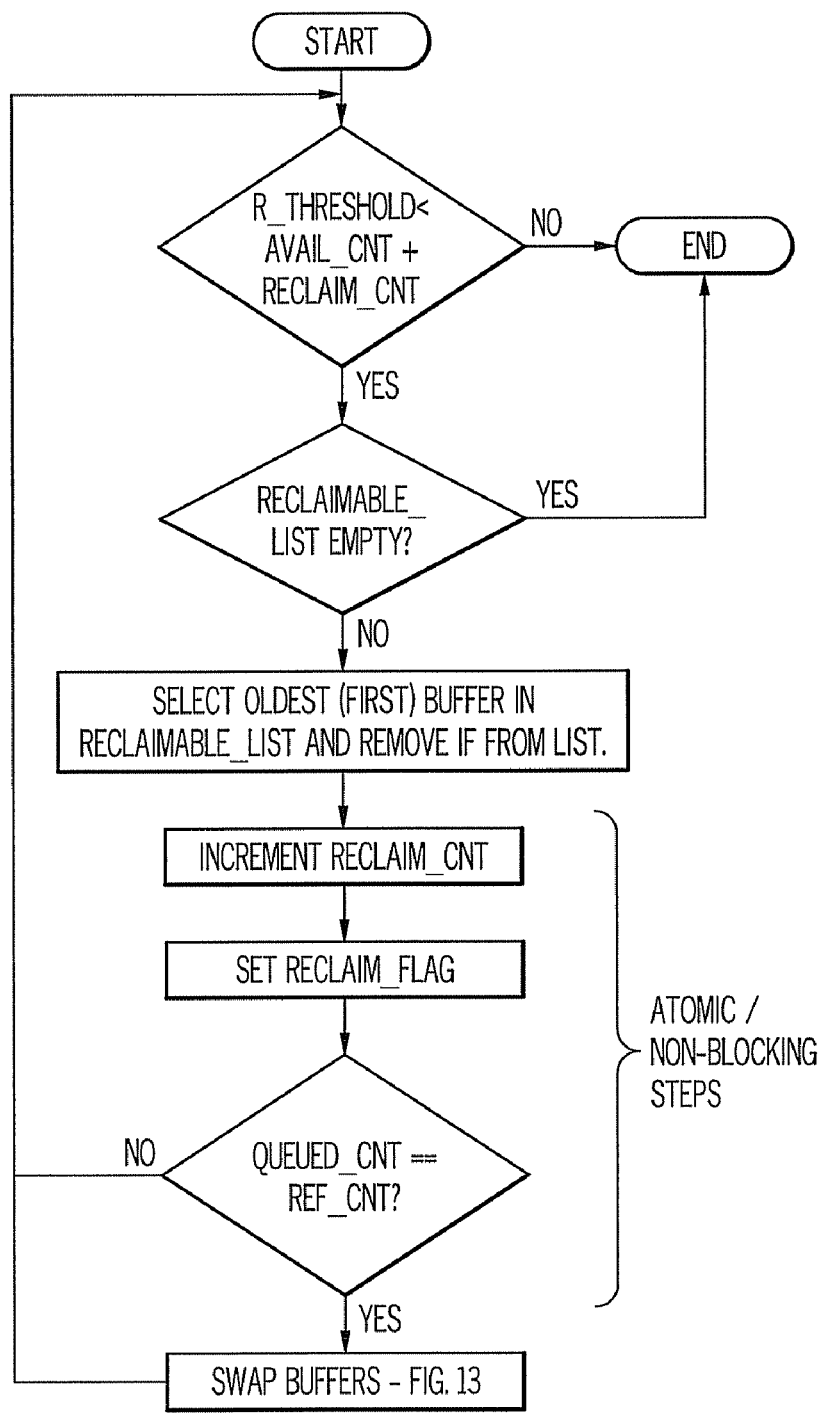
FIG. 8 is a flow chart showing the logic to initiate the reclaim of a buffer.

FIG. 8 is a flow chart showing the logic to initiate the reclaim of a buffer.

Figure 9:
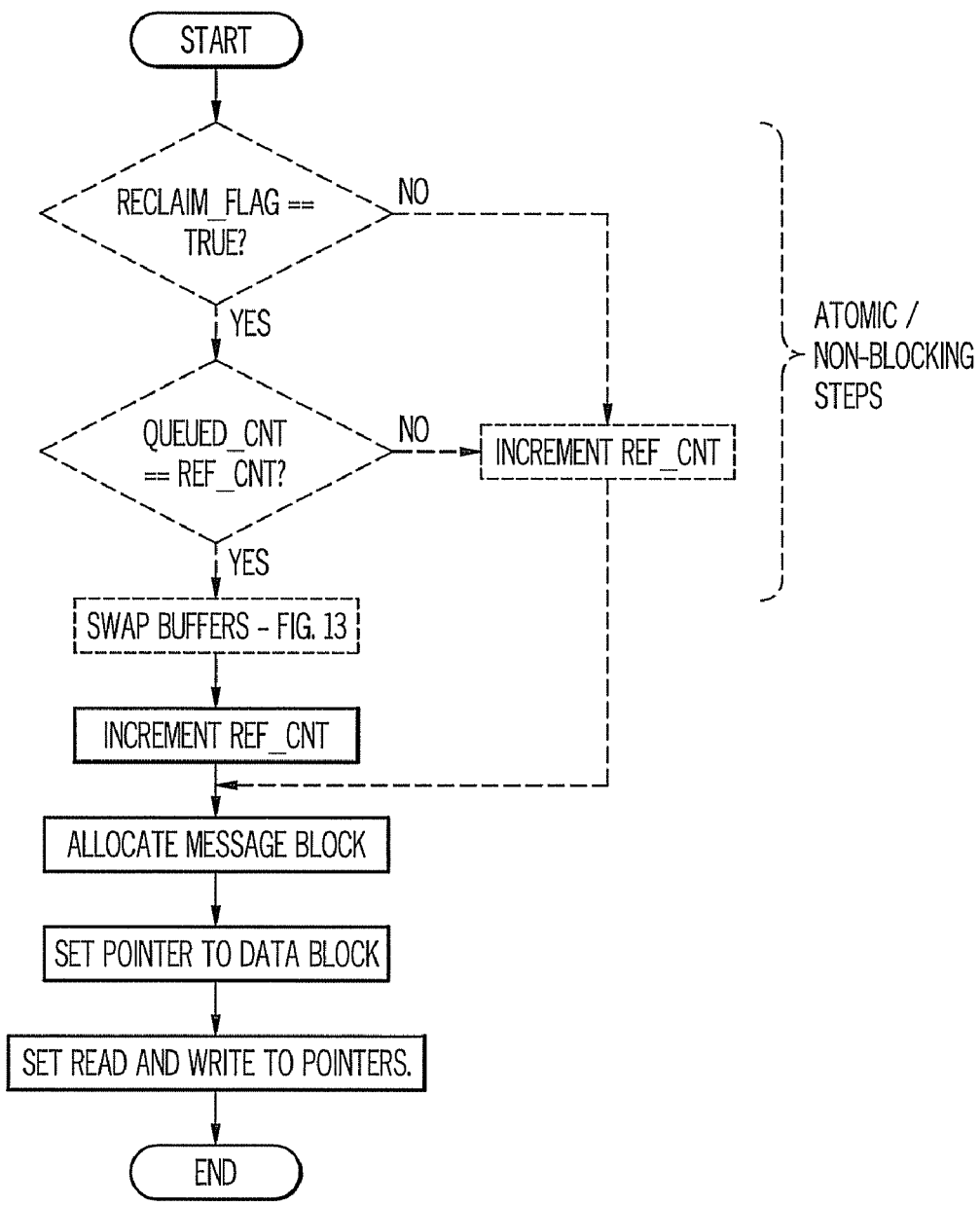
FIG. 9 is a flow chart of the existing dupb function.

FIG. 9 is a flow chart of the existing dupb function. The dashed lines show the new steps added by this invention.

Figure 10:
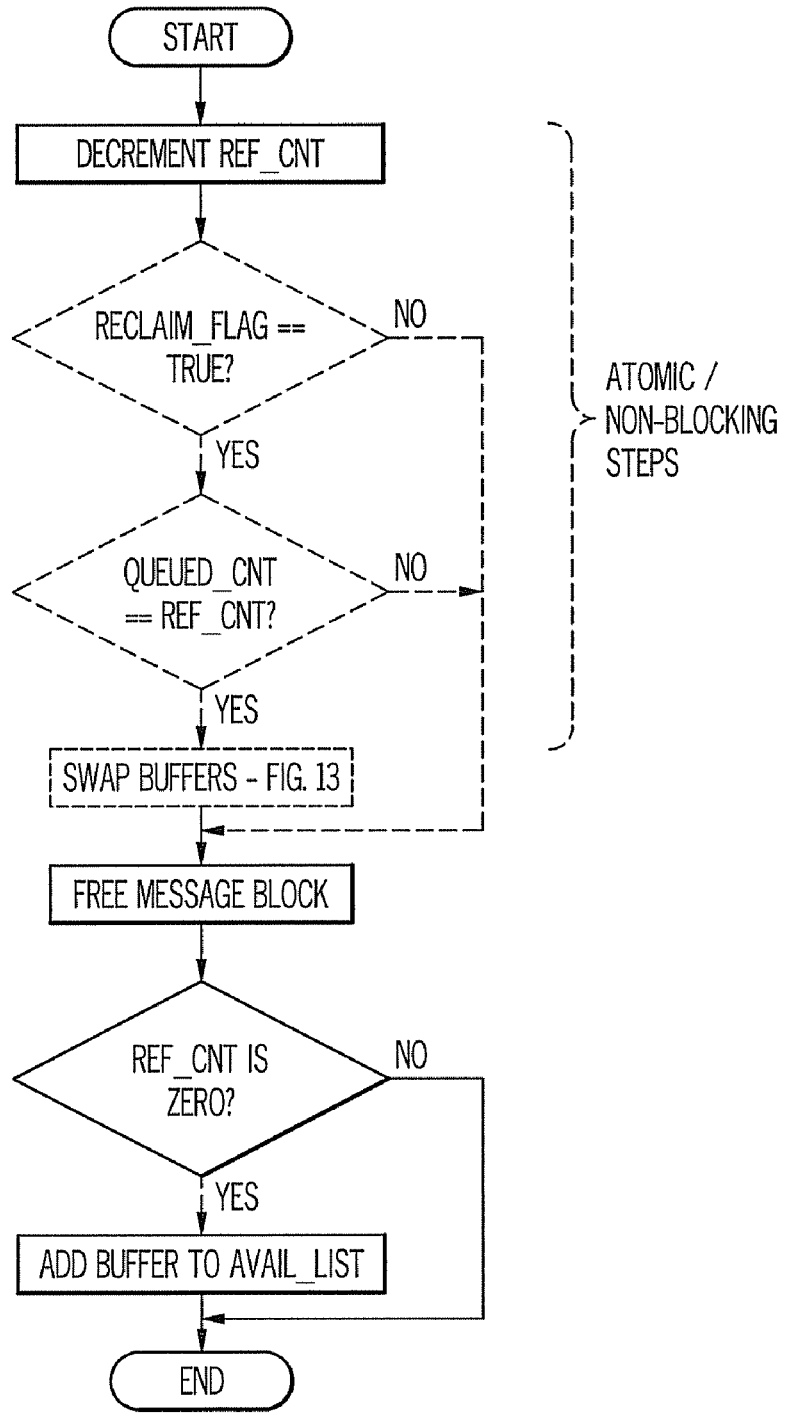
FIG. 10 is a flow chart of the existing freeb function.

FIG. 10 is a flow chart of the existing freeb function. The dashed lines show the new steps added by this invention.

Figure 11:
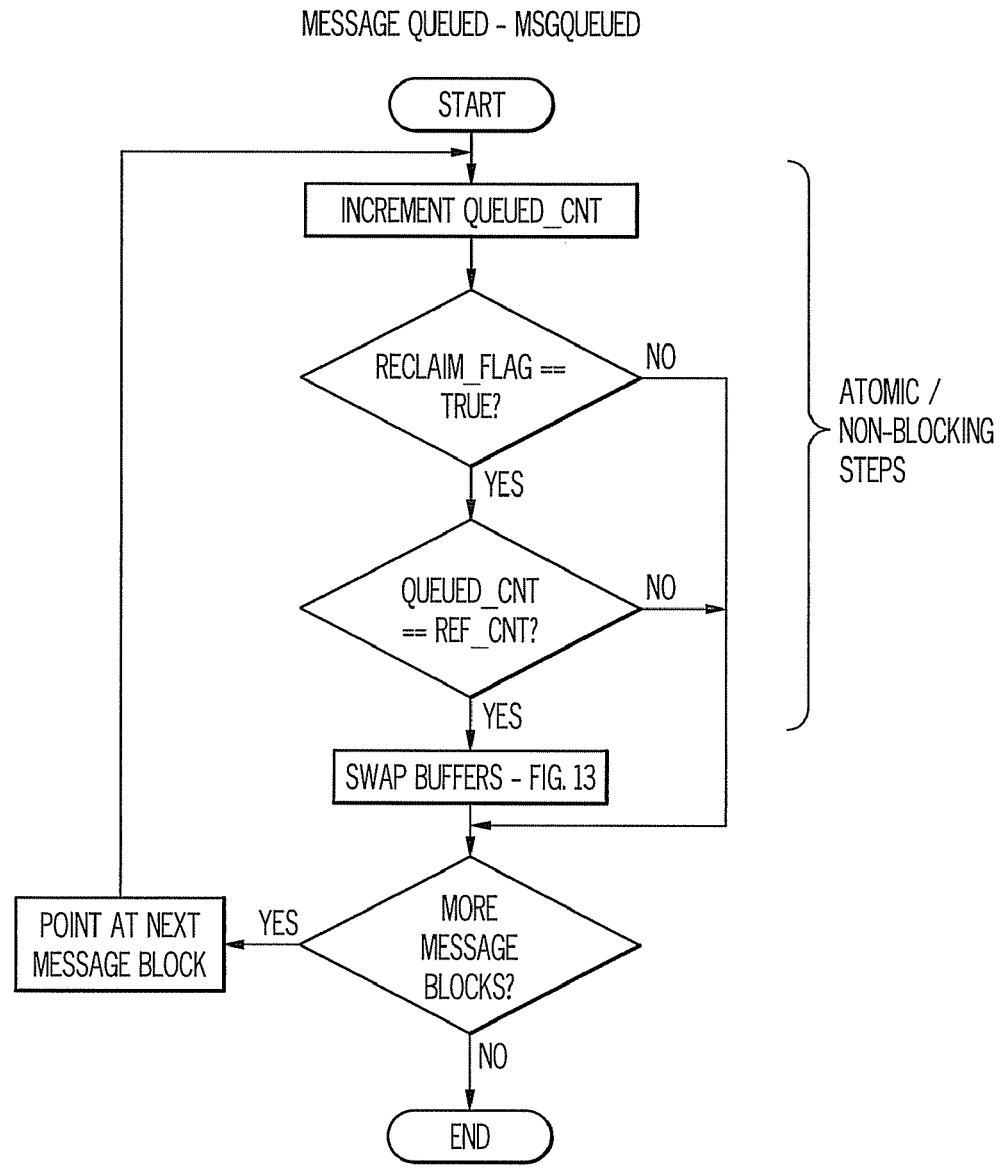
FIG. 11 is a flow chart of the new msgqueued function.

FIG. 11 is a flow chart of the new msgqueued function.

Figure 12:
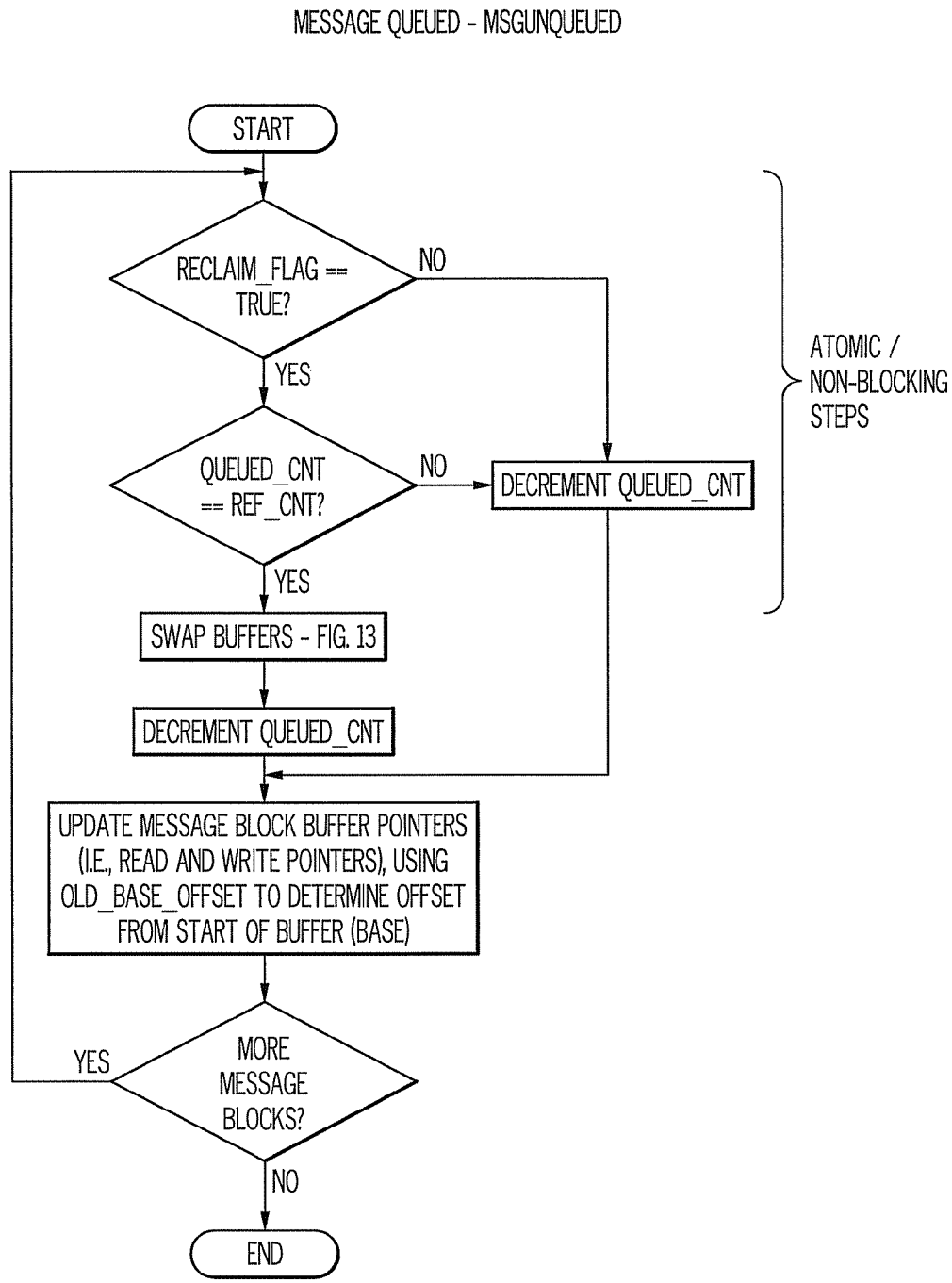
FIG. 12 is a flow chart of the new msgunqueued function.

FIG. 12 is a flow chart of the new msgunqueued function.

Figure 13:
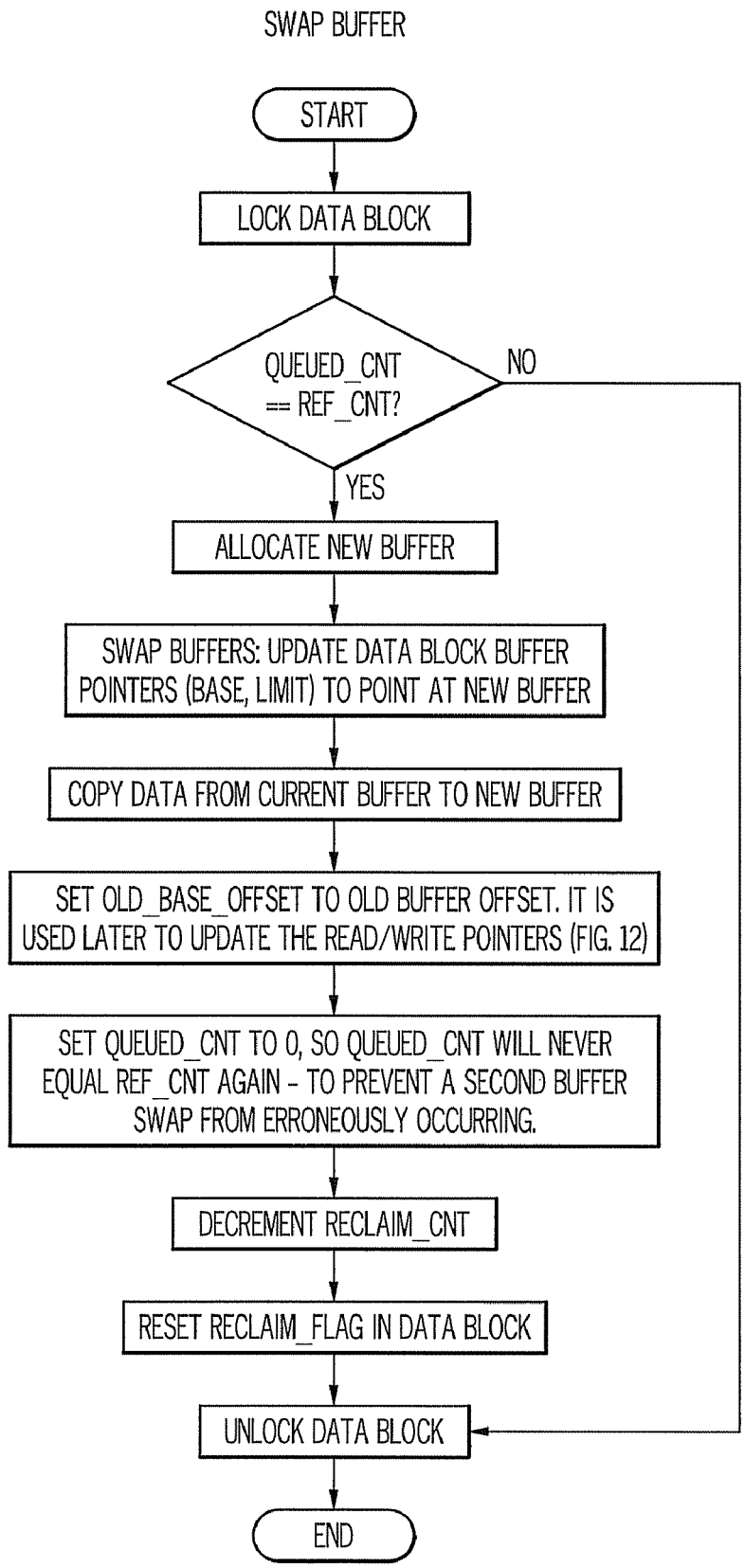
FIG. 13 is a flow chart showing how a buffer is swapped.

FIG. 13 is a flow chart showing how a buffer is swapped.

Figure 14:
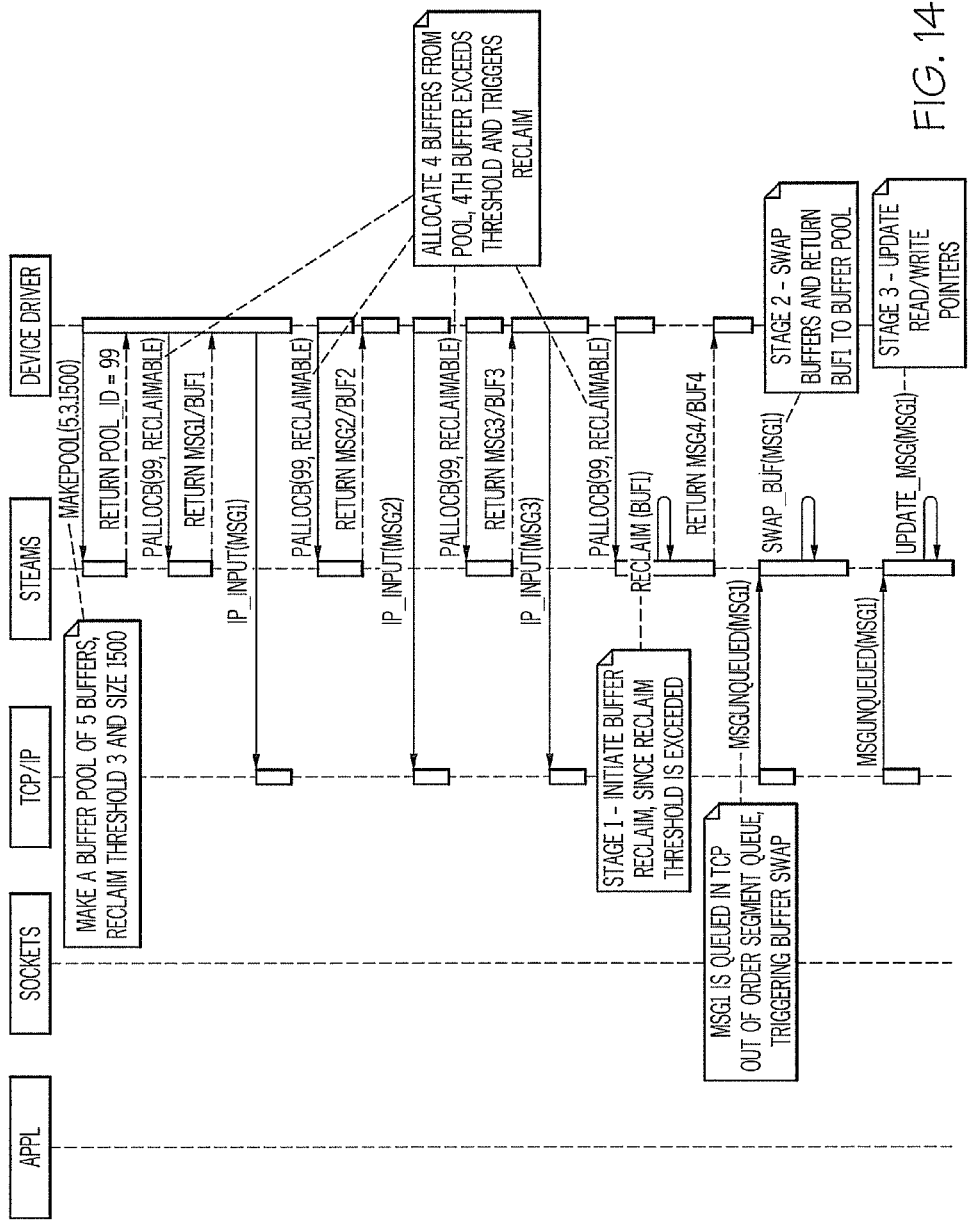
FIG. 14 is an interaction diagram showing an example of how a buffer is reclaimed.

FIG. 14 is an interaction diagram showing an example of how a buffer is reclaimed. In the example, the buffer swap is triggered by msgunqueued; however, it could also be triggered by pallocb, msgqueued, dupb and freeb.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for reclaiming resident buffers, comprising:
    allocating a buffer;
    determining that the buffer allocation pushes a buffer pool below a reclaim threshold;
    if the buffer allocation pushes the buffer pool below a reclaim threshold, marking an oldest in-use buffer to be reclaimed;
    determining that all messages referencing the buffer have been queued;
    if all messages referencing the buffer have been queued, allocating a new buffer and performing a swap between the oldest in-use buffer and the new buffer;
    performing an free message block operation; and
    updating a message block by updating a set of read and write pointers to point to the new buffer.

2. The method as claimed in claim 1 wherein the system calls include allocating the buffer from a buffer pool.

3. The method as claimed in claim 2 wherein the system calls include queuing a message and pointing to a next message.

4. The method as claimed in claim 3 wherein the system calls include unqueuing a message and updating read and write pointers to point at the new buffer.

5. The method as claimed in claim 4 wherein the system calls include freeing a message block.

6. The method as claimed in claim 5 wherein the system calls include duplicating a message block to create a reference to the buffer.

7. The method as claimed in claim 6 wherein swapping the buffers comprises copying data from the buffer to the new buffer and updating the buffer pointers to point at the new buffer.

8. The method as claimed in claim 7 wherein determining that at least one message referencing the buffer is not queued, comprises delaying the buffer swap until all system messages are queued.

9. The method as claimed in claim 7 wherein determining that at least one message referencing the buffer is not queued, comprises delaying the buffer swap until all system messages are freed.

10. A computer readable medium having computer executable instructions for performing a method comprising:
    allocating a buffer;
    determining that the buffer allocation pushes a buffer pool below a reclaim threshold;
    if the buffer allocation rushes the buffer pool below a reclaim threshold, marking an oldest in-use buffer to be reclaimed;
    determining that at least one message referencing the buffer is not queued;
    if all messages referencing the buffer have been queued, allocating a new buffer;
    performing a swap of the system calls between the oldest in-use buffer and the new buffer, when the messages referencing the buffer have all been at least one of queued and freed;

freeing a message block; and updating a message block by updating a set of read and write pointers to point to the new buffer.

11. The computer readable medium as claimed in claim 10 wherein the method further comprises allocating the buffer from a buffer pool.

12. The computer readable medium as claimed in claim 11 wherein the method further comprises queuing a message and pointing to a next message.

13. The computer readable medium as claimed in claim 12 wherein the method further comprises unqueuing a message and updating a set of read and write pointers to point at the new buffer.

14. The computer readable medium as claimed in claim 13 wherein the method further comprises freeing a message block.

15. The computer readable medium as claimed in claim 14 wherein the method further comprises duplicating a message block to create a reference to the buffer.

16. The computer readable medium as claimed in claim 15 wherein the method further comprises copying data from the buffer to the new buffer.

* * * * *